Dec. 2, 1958  D. S. GREER ET AL  2,862,602
WIRE BELT
Filed Oct. 28, 1955
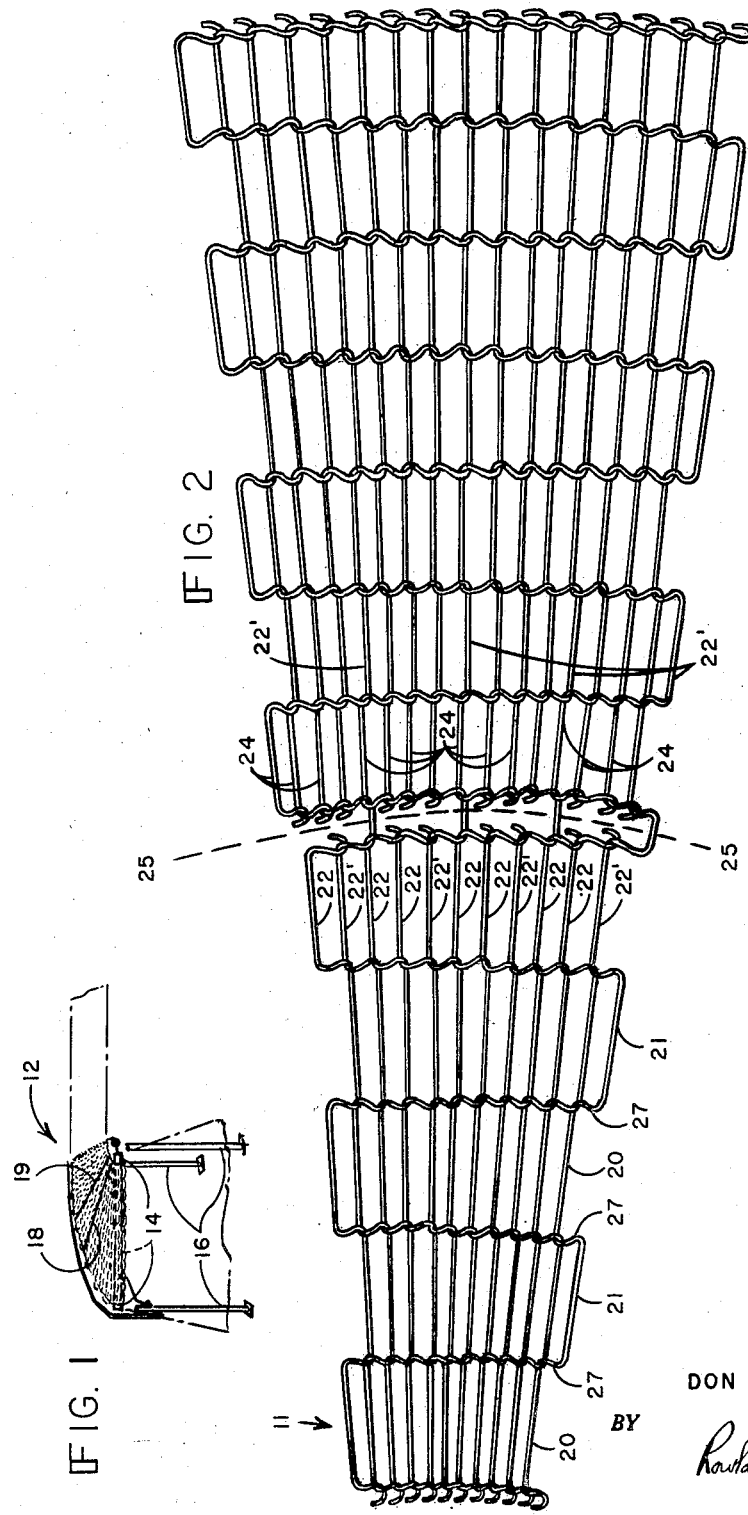
INVENTORS.
DON S. GREER and
JOHN H. LOWE
BY
Rowland V. Patrick

United States Patent Office 2,862,602
Patented Dec. 2, 1958

2,862,602

WIRE BELT

Don S. Greer, Winchester, and John H. Lowe, Waltham, Mass., assignors to Wire Belt Company of America, Incorporated, Cambridge, Mass., a corporation of Maryland Application October 28, 1955, Serial No. 543,431

3 Claims. (Cl. 198—182)

This invention relates to endless conveyor belts, particularly those belts adapted to convey relatively small articles in an arcuate path.

In certain manufacturing processes, such as for example in the manufacture of chocolate-coated confections, fried foods, and cookies, conveyors which traverse an arcuate path are required usually for the purpose of interconnecting other lineal conveyor runs disposed at an angle to one another. Such conveyors are often referred to as turntables, and perhaps the most common of these is the 90° turntable for joining two mutually orthogonal straight conveyor runs. Belts for turntables adapted to handle such articles as those mentioned above, must be finely woven so that the articles will not fall through, and yet on the other hand, they must be sufficiently flexible that they may be drawn around a relatively small diameter nosing as is necessary to prevent disarrangement or damage to the articles conveyed during their transfer to and from the turntable. To meet these requirements, belts of canvas or glazed cloth have been used satisfactorily for turntables adapted to handle relatively small articles, but the same are obviously unsuitable for hot or moist articles, such as fried foods. Furthermore, they sometimes tend to pucker at their edges which not only causes the articles carried thereby to become disarranged, but also tends to make their useable life considerably shorter than that of other belts in service on lineal runs.

Insofar as the problem of hot or moist articles, for example greasy articles, is concerned, there have also been developed for turntables endless wire mesh belts of tapered spiral steel wire strands. In the past, however, the difficulty with these has been that they are not nearly as flexible as is necessary in many applications where, for example, a relatively small turning radius is required, or where the articles to be conveyed must be gently transferred to and from the turntable in order to prevent their being disarranged. Also this type of belt becomes clogged with small particles after a short time and is difficult to clean.

It is an object of the present invention, therefore, to provide an endless metallic wire mesh belt to carry relatively small articles through an arcuate path, which is inherently more flexible than belts of the same general character hitherto known to the art and which can be cleaned much more easily.

It is a further object to provide a belt of the above-mentioned character which can be readily manufactured, and is susceptible of being positively driven in a relatively simple manner.

The belt according to the present invention is made up of a plurality of wire elements extending generally transversely to the arcuate path through which the belt is adapted to travel, each of the wire elements being formed with successive zigzag portions of gradually increasing dimension towards the outer boundary of the path. The wire elements are arrayed closely adjacent one another and in turn are loosely interconnected along their respective lengths. In this way, extreme flexibility is achieved.

The novel features of the invention, together with further objects and advantages thereof, will become more readily apparent when considered in connection with the accompanying drawing wherein:

Fig. 1 is a perspective view of the belt according to the present invention in place on a turntable; and Fig. 2 is a plan view on a greatly enlarged scale of a sectoral section of the belt according to the present invention.

Referring now to the drawing and more particularly to Fig. 1, it will be observed that the belt according to the present invention has been illustrated in conjunction with a 90° turntable generally designated by the numeral 12 having a nose piece 14 and legs 16. It should be understood, however, that the belt is susceptible of use with turntables providing greater or lesser arcuate paths the only difference being that the overall shape of the belt will vary somewhat depending on the particular configuration of the path through which it is adapted to travel. In the case of the 90° path, the belt is generally frustroconical in shape when unfolded free of the turntable, and is generally sectoral in outline, as shown, when stretched out flat between the nosings of the turntable. The belt may be conveniently driven by a series of coaxially mounted gears or sprockets (not shown) of gradually increasing diameter towards the outer edge of the belt although it is equally well suited to various other types of drive mechanisms.

With reference now to Fig. 2, there is shown on a greatly enlarged scale with respect to Fig. 1 (and about ¼ scale with respect to a typical embodiment), a small sectoral section of the belt, as for example that section defined by radial lines 18 and 19 of Fig. 1. To form this section, as an illustration of the manner in which the entire belt is formed, there is provided a first group of wire elements of varying length and a second group of wire elements disposed between the extended portions of the longer elements of the first-named group. Each of the elements extends generally transversely to the path of travel and each is seen to be made up of a series of zigzag portions of gradually increasing dimension toward the outer boundary of the belt from left to right in the drawing. That is to say, with reference first to the elements of the first group only, the shorter ones of which have been designated by numeral 22 and the longer ones of which bear the numeral designation 22' and extend beyond line 25—25, it will be observed that each is formed with alternate straight portions 20 and 21 extending at a slight angle to one another, and with a series of bent portions 27 of gradually increasing length extending between the straight portions so as to permit divergence thereof towards the line 25—25.

With reference now to the region of the belt which lies towards the right of line 25—25, it will be observed that only selected non-adjacent uniformly spaced ones of the elements in the first group extend into this region and, more particularly, the ones that do, namely elements 22', comprise every third one of the elements in the first group. To complete the outer region of the belt, there is provided a second group of wire elements 24, individually formed like the elements of the first group and disposed between the extended portions of elements 22'. Elements 24 have a length which is substantially equal to the length of the extended portions of elements 22' and are terminated in hooks at either end as are elements 22 and 22'. As shown, a comparable mesh spacing is provided throughout the width of the belt by virtue of the fact that three elements 24 are included between each pair of adjacent elements 22' in the outer region as compared with only two of the elements 22 in the inner region. To accommodate the extra element 24 in the outer region, the bent portions of elements 22', just to the right of line 25—25, have a length which is about the same as their length at the extreme inner edge of the belt (towards the left of Fig. 2) and increases gradually towards the outer edge of the belt to a maximum value which is substantially the same as is to be found just to the left of line 25—25. In both inner and outer regions of the belt (towards the right and left of line 25—25, respectively) the bent portions of adjacent elements are looped through one another to loosely interlock them all along the width of the belt. The same is true of adjacent hooked portions at the inner and outer edges of the belt, and adjacent hooks and bends intermediate the ends in the vicinity of line 25—25.

It follows, therefore, that by terminating elements 22 short of line 25—25 and interposing additional elements 24 between the extended portions of elements 22' towards the right of line 25—25 the problem which would otherwise occur of having a mesh spacing at the outer edge of the belt which is much greater than at the inner edge is overcome so that even relatively small articles may be handled. Where, however, relatively large articles only are to be conveyed, it should be apparent that this feature may be dispensed with in which case the whole of the belt would be made up of elements like elements 22. No doubt other modifications within the spirit and scope of the invention will occur to those skilled in the art so that the invention should not be deemed to be limited by the preferred embodiment illustrated and described in detail but only by the scope of the appended claims.

What is claimed is:

1. An endless wire mesh belt to convey relatively small articles in an arcuate path, said belt including a first group of wire elements each being formed with alternate straight portions which extend at a slight angle to one another in a substantially transverse direction to said path and with a series of bent portions of gradually increasing length extending between the straight portions so as to permit divergence thereof towards the outer boundary of said path, the elements of said first group being arrayed adjacent one another, and selected non-adjacent uniformly spaced ones of said elements being extended beyond the remaining intermediate ones thereof for a predetermined distance; and a second group of wire elements individually formed like said first-named elements, the elements of said second group having a length substantially equal to said predetermined distance and being arrayed between the extended portions of said selected elements, the adjacent elements of each of said groups being loosely interlocked thereby permitting the belt to be drawn around a relatively small nose piece.

2. An endless wire mesh belt to convey relatively small articles in an arcuate path, said belt including a first group of wire elements each being formed with alternate straight portions which extend at a slight angle to one another in a substantially transverse direction to said path and with a series of bent portions of gradually increasing length extending between the straight portions so as to permit divergence thereof towards the outer boundary of said path, the elements of said first group being arrayed adjacent one another, and selected non-adjacent uniformly spaced ones of said elements being extended beyond the remaining intermediate ones thereof for a predetermined distance; and a second group of wire elements individually formed like said first-named elements, the elements of said second group having a length substantially equal to said predetermined distance and being arrayed between the extended portions of said selected elements, the bent portions of adjacent elements in each of said groups being looped through one another and the ends of the shorter elements terminating in hooks to loosely interlock the adjacent elements and thereby permit the belt to be drawn around a relatively small nose piece.

3. An endless wire mesh belt to convey articles in an arcuate path, said belt including a first group of wire elements each being formed with alternate straight portions which extend at a slight angle to one another in a substantially transverse direction to said path and with a series of bent portions of gradually increasing length extending between the straight portions so as to permit divergence thereof towards the outer boundary of said path, the elements of said first group being disposed adjacent one another, and selected non-adjacent uniformly spaced ones of said elements having extended portions extending beyond the remaining intermediate elements with the same configuration thereas; and a second group of wire elements of like configuration as the intermediate elements in said first group disposed intermediate the extended portions of said selected elements, the number of intermediate elements in said second group being greater than the intermediate elements in said first group whereby the pitch of the belt is maintained more nearly uniform throughout its width, and the adjacent elements in each of said groups being loosely interlocked thereby permitting the belt to be drawn around a relatively small nose piece.

References Cited in the file of this patent

UNITED STATES PATENTS

| | | |
|---|---|---|
| 1,784,453 | Land | Dec. 9, 1930 |
| 2,278,361 | Rapisarda | Mar. 31, 1942 |
| 2,310,160 | Cohen | Feb. 2, 1943 |